UNITED STATES PATENT OFFICE.

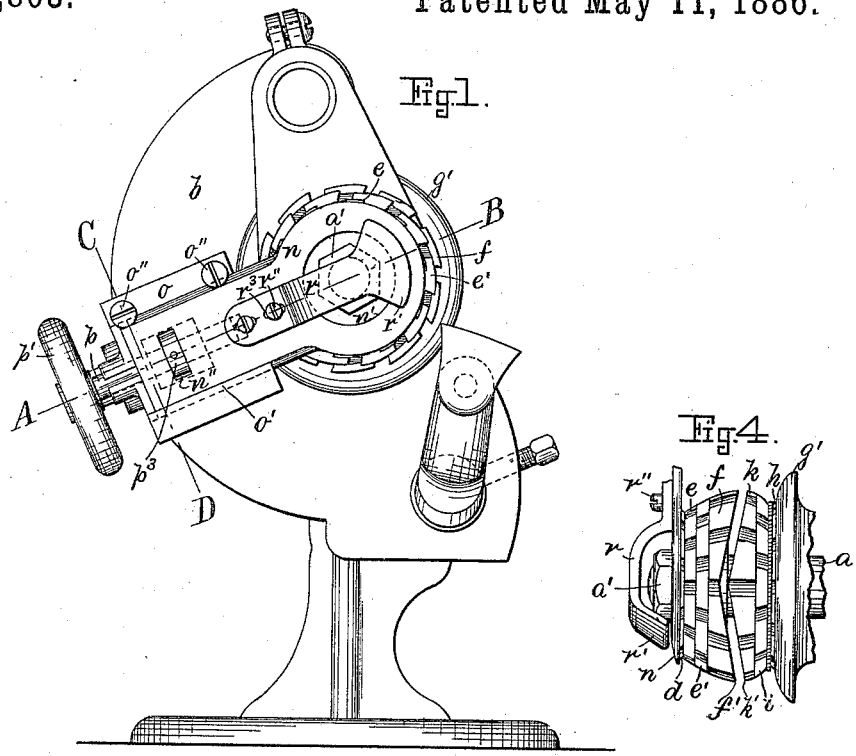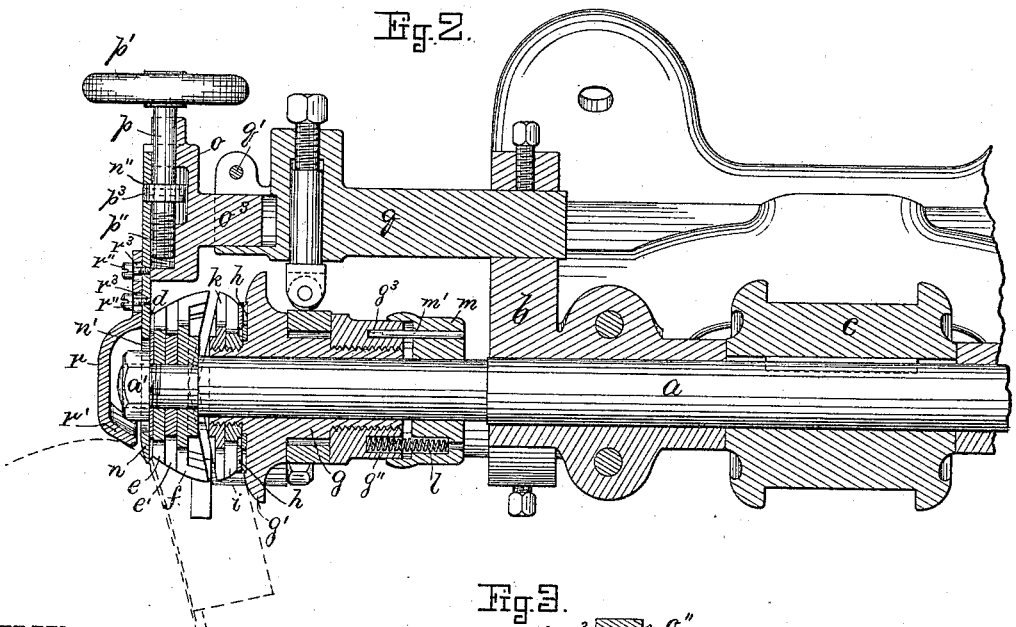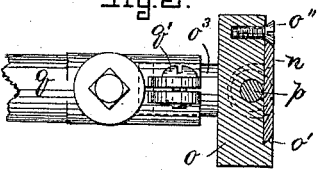

BERNARD GALLAGHER, OF LYNN, MASSACHUSETTS.

HEEL-TRIMMING MACHINE.

SPECIFICATION forming part of Letters Patent No. 341,803, dated May 11, 1886.

Application filed December 5, 1885. Serial No. 184,780. (No model.)

*To all whom it may concern:*

Be it known that I, BERNARD GALLAGHER, a citizen of the United States, residing at Lynn, in the county of Essex and State of Massachusetts, have invented certain new and useful Improvements in Heel-Trimming Machines; and I do hereby declare that the same are fully described in the following specification, and illustrated in the accompanying drawings.

This invention relates to improvements in heel-trimming machines for the purpose of trimming boot and shoe heels, and it is carried out as follows, reference being had to the accompanying drawings, where—

Figure 1 represents an end elevation of the improved machine, and Fig. 2 represents a section on line A B, (shown in Fig. 1.) Fig. 3 represents a cross section on the line C D, shown in Fig. 1, and Fig. 4 represents a plan view of the rotary cutter-head.

Similar letters refer to similar parts wherever they occur on the different parts of the drawings.

$a$ is the rotary cutter-shaft, located in suitable bearings in the frame $b$ and set in motion by means of belt-power applied to the pulley $c$, as usual in heel-trimming machines.

To the outer end of shaft $a$ is secured, first, the toothed rand-cutter $d$, one or more molded and toothed cutters, $e$ $e'$, and the cutter $f$, as shown in Figs. 2 and 4. If so desired, the cutters $e$, $e'$, and $f$ may be made in one single piece, instead of separate, as shown.

Longitudinally yielding on shaft $a$, but rotating with the same, is the sleeve $g$, to the outer end of which is secured the top-lift edge-trimmer $h$, one or more molded and toothed cutters, $i$, and the toothed cutter $k$, as shown in Figs. 2 and 4; or the cutters $i$ and $k$ may be made in one single piece, if so desired.

$g'$ is the annular top-lift rest on sleeve $g$ for the bottom of the heel to rest against during the operation of trimming heels in the same manner as shown and described in the patent granted to me November 10, 1885, No. 330,008. The sleeve $g$ is made to yield longitudinally on shaft $a$ against the influence of springs $l$ $l$, located in longitudinal recesses $g''$ $g''$ in the rear end of sleeve $g$, their free ends pressing against the collar $m$, secured to shaft $a$ in the same manner as shown and described in my patent aforesaid, such collar being likewise provided with pins $m'$, fitting in longitudinal recesses $g^3$ in the end of sleeve $g$, so as to cause said sleeve and its cutters to partake of the rotary motion of shaft $a$.

I wish to state that the yielding sleeve $g$, collar $m$, and springs and pins arranged on same form no part of my present invention, as such features are fully shown, described, and claimed in my aforesaid patent.

The cutters $f$ and $k$, instead of being wedge-shaped, as shown in my patent above mentioned, have their abutting ends made $\searrow\swarrow$-shaped, male and female, so that one will fit into the other when brought together by the influence of springs $l$ $l$.

The $\searrow\swarrow$-shaped ends $f'$ and $k'$ of the respective cutters $f$ and $k$ may be made of any desired angle, and if so desired any number of such $\searrow\swarrow$-shaped surfaces may be made on the ends of said cutters. By this arrangement the cutters $f$ and $k$ may expand from each other more or less, according to variations in the height of the heel operated on, so as to trim every portion of the heel from its top to bottom as it is brought in contact with the rotary cutters.

The advantage of making the cutters $f$ $k$ with correspondingly male and female $\searrow\swarrow$-shaped ends is that by so doing they are balanced most accurately on the rotary shaft $a$, and as the latter is usually made to rotate several thousand revolutions per minute this is very essential for the purpose of preventing chattering and hammering of the shaft and its attachments when rotated.

I am aware that expansive cutters have been made with interlocking parallel projections in one cutter sliding in corresponding parallel recesses in the other; but such is objectionable, on account of one section of the cutter slipping or getting loose on the arbor and backing up against the cutting-edge of the other, thereby clogging the cutters and preventing them from doing the required work. Such objection is entirely obviated in my present invention, where the abutting faces of the expansive cutters are made angular and inclined toward the axis of the arbor, and not parallel to the same, thereby enabling the cutters to perform the work properly without causing any clogging whatever, as the cutting-edges are as free as if the two expansive cutters were made in one single piece.

Another feature of my invention is in the construction and arrangement of the rand-guide $n$. This is made in the form of a plate, independent of the cutter-shaft $a$, and located so as to lie on the outside of the rand-cutter $d$, it being for this purpose preferably made with a slot or perforation, $n'$, through which the nut $a'$ on the end of shaft $a$ projects, as shown in Figs. 1 and 2. Said plate $n$ is made semicircular, or nearly so, in its forward end, its rear end being guided in the block $o$, having on one side a tip, $o'$, and on the opposite side screws $o''$ $o''$, which serve as guides for moving and adjusting the plate $n$ forward and back, according to the size of the cutters used, or according to the amount ground off the latter when sharpened.

For the purpose of adjusting the said plate $n$ as above described, I use a spindle, $p$, having a knob or handle, $p'$, in its rear end and a screw-thread, $p''$, on its front end, working in the screw-threaded forward end of block $o$. On the spindle $p$ is a collar, $p^3$, projecting through a slotted perforation, $n''$, in the plate $n$, by which arrangement the latter can be adjusted forward and back with the greatest ease simply by turning the handle $p'$ of the spindle $p$ a little to the right or left.

For the purpose of being able to still further adjust the rand-guide $n$ relative to the rotary cutters, I provide the block $o$ with a cylindrical shank, $o^3$, on its rear side, such shank being made parallel with the axis of the cutter-shaft $a$, and inserted in the bearing-piece $q$, attached to frame $b$, such bearing-piece being preferably made with a slit in its outer end, and provided with a clamping-screw, $q'$, so as to secure the shank $o^3$ to it in any desired position after being adjusted.

By means of the handle $p'$ on spindle $p$ the rand-guide $n$ may be adjusted forward or back, so that its forward end shall be placed in a proper position relative to the rotary cutters on the shaft $a$. By means of the cylindrical shank $o^3$ and the socketed bearing-piece $q$ and its fastening-screw $q'$ the block $o$ and the rand-guide $n$ may be adjusted not alone longitudinally and parallel to the cutter shaft $a$, to bring the rand-guide $n$ in close proximity to the rand-cutter $d$ on shaft $a$, but it may also be rocked and adjusted in a vertical plane, so as to locate the forward semicircular end of the rand-guide $n$ concentric with the rotary cutters on shaft $a$.

To prevent the cutters from cutting too much off of the heel, as well as preventing the rand-cutter from going in too deep at the junction of the heel and upper of the boot or shoe, I secure to the rand-guide $n$ a counter-guide, $r$, made rigid or yielding, as may be desired, the forward end, $r'$, of which serves as a rest against which the counter of the boot or shoe is pressed, by which means a positive stop is produced for the counter of the boot or shoe, thus relieving the operator of much care in properly trimming the heels and preventing their being trimmed off too much. It is desirable that the said counter-guide $r$ should be capable of adjustment to and from the forward end of the rand-guide $n$, to compensate for the size of cutters used and the curvature of the counter, and for this purpose one or more screws, $r''$ $r''$, are made to pass through slots $r^3$ $r^3$ in the rear portion of the counter guide $r$ and screwed into the plate $n$, as shown in the drawings.

Instead of fastening-screws $r''$ and slots $r^3$, equivalent and well-known fastening and regulating devices may be used without departing from the essence of my invention.

What I wish to secure by Letters Patent and claim is—

1. The combination, with the rotary shaft $a$ and the yielding sleeve $g$, of the cutter $f$, carried by said shaft, and the cutter $k$, carried by said sleeve, the abutting faces of said cutters being formed $\diagdown\diagup$-shaped throughout, one the converse of the other, whereby they are accurately balanced on their supports, substantially as described.

2. In a heel-trimming machine, the block $o$, the adjustable rand-guide $n$, adapted to slide therein, and having slotted opening $n''$, combined with the screw-threaded spindle $p$, its handle $p'$, and collar $p^3$, as and for the purpose set forth.

3. The block $o$, having the rand-guide $n$, made adjustable on it and provided with the cylindrical shank $o^3$, adapted to rest and to be adjusted, as described, in the stationary bearing-piece $q$, as and for the purpose set forth.

4. In a heel-trimming machine, the rotary cutter or cutters, as described, combined with the independent rand-guide $n$ and the counter-guide $r$, arranged upon it, as and for the purpose set forth.

In testimony whereof I have affixed my signature in presence of two witnesses.

BERNARD GALLAGHER.

Witnesses:
 ALBAN ANDRÉN,
 HENRY CHADBOURN.